United States Patent
Fritz-Langhals et al.

(10) Patent No.: US 11,325,923 B2
(45) Date of Patent: *May 10, 2022

(54) PREPARATION OF SILOXANES IN THE PRESENCE OF CATIONIC SILICON (II) COMPOUNDS

(71) Applicant: WACKER CHEMIE AG, Munich (DE)

(72) Inventors: Elke Fritz-Langhals, Ottobrunn (DE); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 106 days.

This patent is subject to a terminal disclaimer.

(21) Appl. No.: 16/753,992

(22) PCT Filed: Oct. 6, 2017

(86) PCT No.: PCT/EP2017/075565
§ 371 (c)(1),
(2) Date: Apr. 6, 2020

(87) PCT Pub. No.: WO2019/068357
PCT Pub. Date: Apr. 11, 2019

(65) Prior Publication Data
US 2021/0017197 A1    Jan. 21, 2021

(51) Int. Cl.
*C08G 77/08* (2006.01)
*C07F 7/02* (2006.01)
*C08G 77/12* (2006.01)

(52) U.S. Cl.
CPC .............. *C07F 7/025* (2013.01); *C08G 77/08* (2013.01); *C08G 77/12* (2013.01)

(58) Field of Classification Search
CPC ..... C08G 77/08; C07F 7/0205; B01J 31/2295
See application file for complete search history.

(56) References Cited

U.S. PATENT DOCUMENTS 10,457,696 B2 * 10/2019 Fritz-Langhals ..... C07F 7/0803
10,730,893 B2 *  8/2020 Fritz-Langhals ....... C07F 17/00

FOREIGN PATENT DOCUMENTS

| DE | 10 3016 205 526 | * 10/2017 |
| DE | 102016205526 A1 | 10/2017 |
| WO | 2013142956 A1 | 10/2013 |

OTHER PUBLICATIONS

Ingo Krossing et al., Schwach koordinierende Anionen—"Nichtkoordinierende Anionen—Traum oder Wirklichkeit? Eine Übersicht zu möglichen Kandidaten", Angewandte Chemie, 2004, vol. 116, pp. 2116-2142, Wiley-VCH Verlag GmbH & Co. KGaA, Weinheim, Germany.

Peter Jutzi et al., The (Me5C5)Si+ Cation: A Stable Derivative of HSi+, Science, Aug. 6, 2004, vol. 305, pp. 849-851, American Association for the Advancement of Science, United States.

Matthias Driess et al., Low-Valent Silicon Cations with Two-Coordinate Silicon and Aromatic Character, Angewandte Chemie International Edition, 2006, vol. 45, pp. 6730-6733, Wiley-VCH Verlag GmbH & Co. KGaA, Weinheim, Germany.

Kinga Leszczynska et al., The Pentamethylcyclopentadienylsilicon(II) Cation as a Catalyst for the Specific Degradation of Oligo(ethyleneglycol) Diethers, Angewandte Chemie International Edition, 2011, vol. 50, pp. 6843-6846, Wiley-VCH Verlag GmbH & Co. KGaA, Weinheim, Germany.

Alexander C. Filippou et al., Silicon (II) Coordination Chemistry: N-Heterocyclic Carbene Complexes of Si2+ and SiI+, Angewandte Chemie International Edition, 2013, vol. 52, pp. 6974-6978, Wiley-VCH Verlag GmbH & Co. KGaA, Weinheim, Germany.

Hui-Xian Yeong et al., A Silyliumylidene Cation Stabilized by an Amidinate Ligand and 4-Dimethylaminopyridine, Chemistry: A European Journal, 2013, vol. 19, pp. 11786-11790, Wiley-VCH Verlag GmbH & Co. KGaA, Weinheim, Germany.

Syed Usman Ahmad et al., A facile access to a novel NHC-stabilized silyliumylidene ion and C—H activation of phenylacetylene, Chemical Communications, 2014, vol. 50, pp. 12619-12622, Royal Society of Chemistry Publishing, London, United Kingdom.

Peter Jutzi et al., The Pentamethylcyclopentadienylsilicon(II) Cation: Synthesis, Characterization, and Reactivity, Chemistry: A European Journal, 2014, vol. 20, No. 30, pp. 9192-9207, Wiley-VCH Verlag GmbH & Co. KGaA, Weinheim, Germany.

Tomohiro Agou et al., Reactions of Diaryldibromodisilenes with N-Heterocyclic Carbenes: Formation of Formal Bis-NHC Adducts of Silyliumylidene Cations, Chemistry: A European Journal, 2014, vol. 20, pp. 9246-9249, Wiley-VCH Verlag GmbH & Co. KGaA, Weinheim, Germany.

* cited by examiner

*Primary Examiner* — Margaret G Moore

(74) *Attorney, Agent, or Firm* — Brooks Kushman P.C.

(57) ABSTRACT

Siloxanes are prepared by reacting:
  a compound A with a compound B or
  a compound A with a compound C or
  a compound B with a compound C or
  a compound C alone,
in the presence of a compound D at ≥40° C., wherein compound A is a silane or a siloxane having at least one silicon-bonded hydrogen atom,
  compound B is a silane or a siloxane having at least one silicon-bonded alkoxy moiety,
  compound C is a silane or a siloxane having at least one silicon-bonded hydrogen atom and at least one silicon-bonded alkoxy moiety, and
  compound D is a cationic Si(II) compound.

18 Claims, No Drawings

PREPARATION OF SILOXANES IN THE PRESENCE OF CATIONIC SILICON (II) COMPOUNDS

CROSS REFERENCE TO RELATED APPLICATIONS

This application is the U.S. National Phase of PCT Appln. No. PCT/EP2017/075565 filed Oct. 6, 2017, the disclosure of which is incorporated in its entirety by reference herein.

BACKGROUND OF THE INVENTION

1. Field of the Invention

The invention relates to a method for preparing siloxanes from mixtures of organosilicon compounds having a silicon-hydrogen moiety and organosilicon compounds having an alkoxy moiety, in the presence of a cationic silicon(II) compound and the mixtures prepared thereby.

2. Description of the Related Art

Various methods are known for preparing siloxane moieties. A common method, for example, is the condensation of silanol moieties with elimination of water according to the reaction equation Si—OH+HO—Si=>Si—O—Si+H$_2$O. However, when using two different silanols, this synthetic route leads to a mixture of hetero- and homocondensation products. A uniform product in principle cannot be prepared in this case. A further disadvantage here is that the water formed can attack further siloxane moieties and therefore leads to equilibration. Various alternative methods have been proposed in the literature by means of which selective linkage is in principle possible. An example is the precious metal-catalyzed dehydrocondensation of Si—H containing silanes or siloxanes and silanols (Si—H+HO—Si=>Si—O—Si+H$_2$). A disadvantage here is the limited stability and industrial availability of silanols and the use of expensive precious metal catalysts. Rubinsztajn and Cella describe a further approach in US 2004/012668, in which they react SiH-containing silanes or siloxanes with alkoxysilanes, with elimination of a hydrocarbon radical and formation of the corresponding siloxanes (Si—H+RO—Si=>Si—O—Si+RH), in the presence of tris(pentafluorophenyl)borane [B(C$_6$F$_5$)$_3$] as catalyst.

A disadvantage when using B(C$_6$F$_5$)$_3$ is that the catalyst is consumed during the reaction with formation of catalytically inactive compounds, particularly dimethyl(pentafluorophenyl)silane. As a result, the reaction slows down and there is the danger that the reaction prematurely comes to a standstill. Catalyst must then be added again. This complicates the process control considerably and diminishes the reproducibility of the reaction. The use of comparatively large amounts of catalyst already at the start of the reaction is not a solution to the problem since this results in an unfavorable process profile with a very rapid initial phase which, owing to the exothermicity of the reaction, can only be controlled technically with difficulty and is a considerable safety risk. In addition, the method is considerably more expensive due to the increased use of catalyst and the consumption thereof by deactivation.

The object was therefore to provide a method which does not have the disadvantages mentioned above.

SUMMARY OF THE INVENTION

The invention relates to a method for preparing siloxanes, in which a compound A is reacted with a compound B or
a compound A is reacted with a compound C or
a compound B is reacted with a compound C or
a compound C is reacted without compound A and B
in the presence of a compound D at at least 40° C.,
wherein
compound A is a silane or a siloxane, which comprises at least one hydrogen atom bonded directly to silicon,
compound B is a silane or a siloxane, which comprises at least one alkoxy moiety bonded directly to silicon,
compound C is a silane or a siloxane, which comprises at least one hydrogen atom bonded directly to silicon and at least one alkoxy moiety bonded directly to silicon and
compound D is a cationic Si(II) compound of general formula V $$([Si(II)Cp]^+)_a X^{a-}, \quad (V)$$

in which
Cp is a π-bonded cyclopentadienyl radical of general formula VI, which is substituted by radicals R$^y$,

(VI)

R$^y$ are monovalent radicals or polyvalent radicals which can also bond to one another to form fused rings and
X$^{a-}$ signifies an a valent anion, which does not react with the cationic silicon(II) center under the reaction conditions, or
the compound D is selected from the cationic Si(II) compounds:

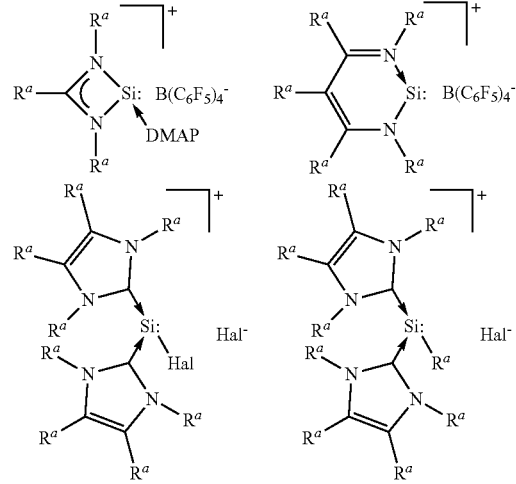

wherein the radicals R$^a$ are each independently hydrocarbon radicals and Hal signifies halogen.

DETAILED DESCRIPTION OF THE PREFERRED EMBODIMENTS

In the method, silanes and/or siloxanes are reacted by means of a condensation reaction to form siloxane moieties. The invention also relates to a mixture M, comprising a compound A with a compound B or
a compound A with a compound C or
a compound B with a compound C
and a compound D,
with the proviso that the compound B has no vinyl group.

It has been found that, surprisingly, the reaction of organosilicon compounds comprising Si-alkoxy moieties with organosilicon compounds comprising Si—H moieties, in the presence of a cationic silicon(II) compound as catalyst, to form Si—O—Si bonds, i.e. siloxane moieties, proceeds without the disadvantages mentioned above. As a result, the process control is significantly simplified and the reproducibility of the reaction is distinctly increased. The excess consumption of catalyst resulting in increased costs is avoided.

Compound A, having at least one hydrogen atom bonded directly to silicon, preferably has general formula I $$R^1R^2R^3Si-H \quad (I)$$

wherein the radicals $R^1$, $R^2$ and $R^3$ each independently have the definition hydrogen, halogen, silyloxy radical or hydrocarbon radical, wherein individual carbon atoms in each case may be replaced by oxygen atoms, halogen, sulfur or phosphorus atoms. Particularly preferably, the radicals $R^1$, $R^2$ and $R^3$ are each independently hydrogen, halogen, unbranched, branched, linear, acyclic or cyclic, saturated or mono- or polyunsaturated C1-C20 hydrocarbon radical or unbranched, branched, linear or cyclic, saturated or mono- or polyunsaturated C1-C20 hydrocarbon radical, wherein individual carbon atoms may be replaced by oxygen, halogen or sulfur, or silyloxy radical, preferably of general formula II

$$(SiO_{4/2})_a(R^xSiO_{3/2})_b(R^x_2SiO_{2/2})_c(R^x_3SiO_{1/2})_d \quad (II)$$

in which
$R^x$ are each independently hydrogen, halogen, unbranched, branched, linear, acyclic or cyclic, saturated or mono- or polyunsaturated C1-C20 hydrocarbon radical or unbranched, branched, linear or cyclic, saturated or mono- or polyunsaturated C1-C20 hydrocarbon radical, wherein individual carbon atoms may be replaced by oxygen, halogen or sulfur, a, b, c and d are each independently integer values from 0 to 100,000, wherein the sum total of a, b, c and d together has at least the value 1.

More preferably, the radicals $R^1$, $R^2$ and $R^3$ are each independently hydrogen, chlorine, C1-C3-alkyl or alkylene radicals, phenyl radical or silyloxy radicals of general formula II, in which $R^x$ are each independently hydrogen, chlorine, C1-C6 alkyl or alkylene or phenyl.

Radicals $R^1$, $R^2$ and $R^3$ are most preferably the radicals methyl, ethyl, propyl, phenyl, chlorine or silyloxy, especially of general formula II.

Radicals $R^x$ are particularly preferably the radicals methyl, ethyl, propyl, phenyl and chlorine.

Examples of compounds A of general formula (I) are the following silanes (Ph=phenyl, Me=methyl, Et=ethyl): Me₃SiH, Et₃SiH, Me₂PhSiH, MePh₂SiH, Me₂ClSiH, Et₂ClSiH, MeCl₂SiH, Cl₃SiH, Me₃Si—O—SiMe₂H, HSiMe₂—O—SiMe₂H, Me₃Si—O—SiHMe-O—SiMe₃, H—SiMe₂—(O—SiMe₂)$_m$—O—SiMe₂—H where m=1 to 20,000, Me₃Si—O—(SiMe₂—O)$_n$(SiHMe-O)$_o$—SiMe₃ where n=1 to 20,000 and o=1 to 20,000.

Compound A can also be a mixture of different compounds of general formula (I), in which the radicals $R^1$, $R^2$ and $R^3$ can optionally be different radicals of general formula (II).

Compound B, having at least one alkoxy moiety bonded directly to silicon, preferably has general formula III

$$R^4R^5R^6Si-O-CH_2-R^7 \quad (III)$$

wherein the radicals $R^4$, $R^5$ and $R^6$ each independently have the definition hydrogen, halogen, silyloxy radical, preferably of general formula II, or hydrocarbon radical, wherein individual carbon atoms in each case may be replaced by oxygen atoms, halogen, sulfur or phosphorus atoms and $R^7$ has the definition hydrogen or hydrocarbon radical, in which individual non-adjacent carbon atoms may be replaced by oxygen atoms, silicon, halogen, sulfur or phosphorus atoms.

More preferably, the radicals $R^4$, $R^5$ and $R^6$ are each independently hydrogen, halogen, unbranched, branched, linear, acyclic or cyclic, saturated or mono- or polyunsaturated C1-C20 hydrocarbon radicals or unbranched, branched, linear or cyclic, saturated or mono- or polyunsaturated C1-C20 hydrocarbon radicals, wherein individual carbon atoms may be replaced by oxygen, halogen or sulfur, or silyloxy radical of general formula II, in which
$R^x$ has the aforementioned definitions and preferred definitions.

$R^7$ is most preferably hydrogen, an unbranched, branched, linear, acyclic or cyclic, saturated or mono- or polyunsaturated C1-C20 hydrocarbon radical, or an unbranched, branched, linear or cyclic, saturated or mono- or polyunsaturated C1-C20 hydrocarbonoxy radical, wherein individual carbon atoms may be replaced by oxygen, halogen or sulfur, or a silyloxy radical of general formula II, in which $R^x$ has the aforementioned definitions and preferred definitions.

a, b, c and d are each independently integral values from 0 to 100,000, wherein the sum total of a, b, c and d together has at least the value 1.

Preferably, a has values from 1 to 500, especially 2 to 50.
Preferably, b has values from 1 to 500, especially 2 to 50.
Preferably, c has values from 3 to 10 000, especially 4 to 1000.
Preferably, d has values from 1 to 100, especially 2.
The sum total of a+b+c+d is preferably 4 to 20,000, most preferably 6 to 5000, and especially 10 to 500.

Most preferably, the radicals $R^4$, $R^5$ and $R^6$ are each independently a hydrogen, chlorine, C1-C3-alkyl or alkylene radical, phenyl radical or silyloxy radical of general formula II, in which $R^x$ are each independently hydrogen, chlorine, C1-C6 alkyl or alkylene or phenyl.

Most preferably, $R^7$ is hydrogen, C1-C6-alkyl or alkylene radical or phenyl radical.

Radicals $R^4$, $R^5$ and $R^6$ are particularly preferably a methyl, ethyl, propyl, phenyl, chlorine or silyloxy radical, especially of general formula II.

Radicals $R^7$ are particularly preferably the radicals methyl, ethyl, propyl, butyl or pentyl.

Radicals $R^x$ are particularly preferably the radicals methyl, ethyl, propyl, phenyl and chlorine.

Examples of compounds B of general formula III are the following silanes (Ph=phenyl, Me=methyl, Et=ethyl): Me₃SiOEt, Me₃SiOMe, Et₃SiOEt, Et₃SiOMe, Me₂PhSiOEt, Me₂PhSiOMe, MePh₂SiOEt, and the following siloxanes: Me₃Si—O—SiMe₂OMe, Me₃Si—O—SiMe₂OEt, EtO-SiMe₂—O—SiMe₂OEt, Me₃Si—O—SiMe(OMe)—O—SiMe₃, Me₃Si—O—SiMe(OEt)—O—SiMe₃MeO-SiMe₂—(O—SiMe₂)$_m$—O—SiMe₂—OMe and EtO-SiMe₂—(O—SiMe₂)$_m$—O—SiMe₂-OEt where m=1 to 20,000, Me₃Si—

O—(SiMe$_2$—O)$_n$(SiMe(OMe)—O)$_o$—SiMe$_3$ and Me$_3$Si—O—(SiMe$_2$—O)$_n$(SiMe(OEt)—O)$_o$—SiMe$_3$ where n=1 to 20,000 and o=1 to 20,000.

Compound B can also be a mixture of different compounds of general formula III, in which the radicals R$^4$, R$^5$ and R$^6$ may optionally be different radicals of general formula II.

Compound C, having at least one hydrogen atom bonded directly to silicon and having at least one alkoxy moiety bonded directly to silicon, preferably has general formula IV

wherein the radicals R$^8$, R$^9$ and R$^{10}$ each independently have the definition hydrogen, halogen, silyloxy radical, preferably of aforementioned general formula II, or hydrocarbon radical, wherein individual carbon atoms in each case may be replaced by oxygen atoms, halogen, sulfur or phosphorus atoms and R$^{11}$ has the definition hydrogen or hydrocarbon radical, in which individual non-adjacent carbon atoms may be replaced by oxygen atoms, silicon, halogen, sulfur or phosphorus atoms, wherein at least one of the radicals R$^8$, R$^9$ and R$^{10}$ is a hydrogen or at least one of the radicals R$^8$, R$^9$ and R$^{10}$ is a silyloxy radical, which comprises a hydrogen atom bonded directly to silicon.

Preferred radicals R$^8$, R$^9$ and R$^{10}$ correspond to the preferred radicals R$^4$, R$^5$ and R$^6$. Preferred radicals R$^{11}$ correspond to the preferred radicals R$^7$.

Compound D comprises one or more cationic Si(II) moieties. Compounds D are silicon(II) compounds which are present in cationic form—so-called silyliumylidene cations.

Cp is the cyclopentadienyl anion, which consists of a singly negatively charged, aromatic five-membered ring system C$_5$R$^y_5$$^-$. Radicals R$^y$ are each independently preferably hydrogen, C1-C20 hydrocarbon radicals, more preferably linear or branched, acyclic or cyclic, saturated or mono- or polyunsaturated C1-C20 alkyl or aryl, yet more preferably C1-C3 alkyl, and especially methyl radicals.

Examples of radicals R$^y$ are alkyl radicals such as the methyl, ethyl, n-propyl, isopropyl, n-butyl, sec-butyl, isobutyl, tert-butyl, n-pentyl, sec-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,4,4-trimethylpentyl radical; nonyl radicals such as the n-nonyl radical; decyl radicals such as the n-decyl radical; dodecyl radicals such as the n-dodecyl radical; hexadecyl radicals such as the n-hexadecyl radical; octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m- and p-tolyl, xylyl, mesitylenyl and o-, m- and p-ethylphenyl radicals; and aralkyl radicals such as the benzyl radical, and the α- and β-phenylethyl radicals.

The preparation of compounds D is described in So et al, Chem. Eur. J. 2013, 19, 11786, Driess et al., Angew. Chem. Int. Ed. 2006, 45, 6730, Filippou, Angew. Chem. Int. Ed. 2013, 52, 6974, Sasamori et al, Chem. Eur. J. 2014, 20, 9246 and in Inoue et al., Chem. Commun. 2014, 50, 12619 (DMAP=dimethylaminopyridine).

In the formulae, the radicals R$^a$ are each independently preferably alkyl or optionally substituted phenyl, more preferably branched alkyl or 2,6-dialkylated phenyl and Hal signifies halogen, preferably chlorine, bromine or iodine. Examples of radicals R$^a$ are methyl, isopropyl, tert-butyl, 2,6-diisopropylphenyl or 2,4,6-triisopropylphenyl.

X$^{a-}$ is any a valent anion, which does not react with the cationic silicon(II) center under the reaction conditions. It can be either inorganic or organic. Preferably, a has the values 1, 2 or 3, especially 1.

X$^-$ is preferably halogen or a complex anion such as BF$_4$$^-$, ClO$_4$$^-$, AlZ$_4$$^-$, MF$_6$$^-$ where Z=halogen and M=P, As or Sb, or aryl borate anion, wherein the aryl radical is preferably phenyl or fluorinated phenyl or phenyl substituted by perfluoroalkyl radicals, monovalent polyhedral anion such as carborate anion for example, or alkoxy and aryloxy metallation.

Examples of anions X$^-$ are tetrachlorometallates [MCl$_4$]$^-$ where M=Al, Ga, tetrafluoroborates [BF$_4$]$^-$, hexafluorometallates [MF$_6$]$^-$ where M=As, Sb, Ir, Pt, perfluoroantimonates [Sb$_2$F$_{11}$]$^-$, [Sb$_3$F$_{16}$]$^-$ and [Sb$_4$F$_{21}$]$^-$, triflate (=trifluoromethanesulfonate) [OSO$_2$CF$_3$]$^-$, tetrakis(trifluoromethyl)borate [B(CF$_3$)$_4$]$^-$, tris(pentafluorophenyl)hydridometallates [MH(C$_6$F$_5$)$_3$]$^-$ where M=B, Al, Ga, tetrakis(pentafluorophenyl)metallates [M(C$_6$F$_5$)$_4$]$^-$ where M=B, Al, Ga, tetrakis(pentachlorophenyl)borate [B(C$_6$Cl$_5$)$_4$]$^-$, tetrakis[(2,4,6-trifluoromethyl(phenyl)]borate $\{B[C_6H_2(CF_3)_3]\}^-$, [bis[tris(pentafluorophenyl)] hydroxide $\{HO[B(C_6F_5)_3]_2\}^-$, closo-carborates [CHB$_{11}$H$_5$Cl$_6$]$^-$, [CHB$_{11}$H$_5$Br$_6$]$^-$, [CHB$_{11}$(CH$_3$)$_5$Br$_6$]$^-$, [CHB$_{11}$F$_{11}$]$^-$, [C(Et)B$_{11}$F$_{11}$]$^-$, [CB$_{11}$(CF$_3$)$_{12}$]$^-$ and B$_{12}$Cl$_{11}$N(CH$_3$)$_3$]$^-$, tetra(perfluoroalkoxy)aluminates [Al(OR$^{PF}$)$_4$]$^-$, tris(perfluoroalkoxy)fluoroaluminates [FAl(OR$^{PF}$)$_3$]$^-$, hexakis(oxypentafluorotellurium)antimonate [Sb(OTeF$_5$)$_6$]$^-$.

An overview of particularly preferred complex anions X$^-$ can be found, for example, in Krossing et. al., Angew. Chem. 2004, 116, 2116.

The cationic silicon(II) compound of general formula V can be prepared, for example, by adding an acid H$^+$X$^-$ to the compound Si(II)Cp$_2$, whereupon one of the anionic Cp radicals is eliminated in protonated form:

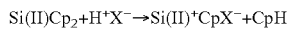

The anion X$^-$ of the acid HX then forms the counterion of the cationic silicon(II) compound.

A preparation method for the cationic Si(II) compound of general formula V is described in Science 2004, 305, pp. 849-851.

The molar ratio between the hydrogen atoms present bonded directly to silicon and alkoxy moieties present bonded directly to silicon is preferably from 1:100 to 100:1, more preferably from 1:10 to 10:1, and especially from 1:2 to 2:1.

The molar proportion of cationic silicon(II) compound D is, based on the Si—H moieties present, preferably at least 0.0001 mol % and at most 10 mol %, more preferably at least 0.001 mol % and at most 1 mol %, especially at least 0.01 mol % and at most 0.1 mol %.

Compounds A, B, C and D can be mixed in any sequence, in which the mixing takes place in a manner known to those skilled in the art. In a preferred embodiment, compound A and compound B and optionally C are mixed and compound D is then added, preferably while stirring.

Components A, B, C and D may optionally be pre-dissolved in a solvent or in a solvent mixture and then combined. In a particular embodiment, compound D (solid) is dissolved in a solvent and then combined with the mixture of A and B and optionally C.

The proportion of solvent or solvent mixture, based on compound A, is preferably at least 0.01% by weight and at most a 1000-fold amount by weight, more preferably at least 1% by weight and at most a 100-fold amount by weight, and especially at least 10% by weight and at most a 10-fold amount by weight.

The solvents used are preferably aprotic solvents, for example hydrocarbons such as pentane, hexane, heptane, cyclohexane or toluene, chlorohydrocarbons such as dichloromethane, chloroform, chlorobenzene or 1,2-dichloroethane, or nitriles such acetonitrile or propionitrile.

Preference is given to solvents or solvent mixtures having a boiling point or boiling range of up to 120° C. at 0.1 MPa.

The solvents are preferably aromatic or aliphatic hydrocarbons. The reaction can be carried out at atmospheric pressure or under reduced or elevated pressure.

The pressure is preferably at least 0.01 bar and at most 100 bar, more preferably at least 0.1 bar and at most 10 bar, and especially the reaction is carried out at atmospheric pressure.

The reaction of A and B and optionally C in the presence of D is preferably conducted at temperatures between at least 40° C. and at most +200° C., more preferably between at least 50° C. and at most 150° C., and especially between at least 60° C. and at most 120° C.

The mixture may comprise as additives E, which are not reactive with components A, B, C and D, any desired further compounds such as processing aids, emulsifiers, fillers, highly dispersed silica or quartz, adhesion promoters, stabilizers, radical inhibitors, pigments, dyes or white pigments, e.g. chalk or titanium dioxide, plasticizers, organic polymers, heat stabilizers, inhibitors, biologically active ingredients and polyorganosiloxanes, e.g. polyorganosiloxane oils such as polydimethylsiloxane oils (Ak oils), and resin-like polyorganosiloxanes. The additives E are preferably present in the method.

The mixture of A, B and optionally C and D comprises the additives that are non-reactive with the components, preferably at a proportion of 0.0001 to 70% by weight, especially at a proportion of 0.1 to 40% by weight.

In a further embodiment, copolymers are produced by using components A comprising more than one Si—H moiety and components B comprising more than one silicon-alkoxy moiety or compounds C comprising both Si—H moieties and Si-alkoxy moieties.

In a further embodiment, the condensation reaction according to the invention is used for removing low proportions of Si-alkoxy moieties, which are present in products as labile impurities which are therefore often disruptive in applications, which have been produced by other processes, for example hydrolytic condensation reactions, by using said condensation reaction with A in the presence of D.

The labile Si-alkoxy moieties are converted here to inert Si—O—Si moieties.

In an analogous manner, products still comprising undesired Si—H moieties, for example from hydrosilylation reactions, can also be converted by reaction with B in the presence of D.

All aforementioned symbols relating to the formulae above have definitions in each case that are each independent of one another.

Unless stated otherwise, all amounts and percentages are based on weight and all temperatures are 20° C.

Example 1

301.2 mg (1.11 mmol) of diethoxydiphenylsilane and 326.7 mg (2.20 mmol) of 1,1,3,3,3-pentamethyldisiloxane are mixed under an inert gas atmosphere at 20 to 25° C., to which is added with shaking a solution of 0.108 mg (0.160 μmol, ca. 172 ppm) of $(\pi\text{-Me}_5C_5)Si^+HB(C_6F_5)_3^-$ in 41 mg of dideuterodichloromethane. The mixture is heated at 60° C. for 2 hours, whereupon gaseous ethane evolves, and the reaction product formed, 1,1,1,3,3,7,7,9,9,9-decamethyl-5,5-diphenylpentasiloxane, is investigated by NMR spectroscopy.

$^1$H-NMR (CD$_2$Cl$_2$): δ=0.16 (s, 2 SiMe$_3$), 0.21 (s, 2 SiMe$_2$), 7.41-7.52 (m, 6 aromatic H), 7.73-7.80 (m, 4 aromatic H) ppm.

Example 2

181.2 mg (0.665 mmol) of diethoxydiphenylsilane are mixed with 99.6 mg (0.742 mmol) of 1,1,3,3-tetramethyldisiloxane under an inert gas atmosphere at 20 to 25° C., to which is added with shaking a solution of 0.228 mg (0.160 μmol, ca. 172 ppm) of $(\pi\text{-Me}_5C_5)Si^+HB(C_6F_5)_3^-$ in 90 mg of dideuterodichloromethane at room temperature. The mixture is heated at 60° C. for 2 hours, whereupon gaseous ethane evolves and the signals of the Si-OEt and the Si—H groups in the $^1$H-NMR spectrum are in the range of <50.

Molecular weight of the copolymeric product formed (determination by GPLC) ~10,000 D.

Example 3

150.6 mg of a trimethylsiloxy end-terminated polysiloxane having pendant Si—H moieties of the composition Me$_3$Si—O—(SiMe$_2$—O)$_x$—(SiHMe-O)$_y$—SiMe$_3$, where x ~28.5 and y ~11.4, (corresponds to 0.584 mmol of Si—H) and 78.5 mg (0.664 mmol) of trimethylethoxysilane are mixed at 20 to 25° C. and 0.147 mg (0.217 μmol, ca. 642 ppm) of $(\pi\text{-Me}_5C_5)Si^+HB(C_6F_5)_3^-$ in 58 mg of dideuterodichloromethane is added. The mixture is heated at 60° C. for 2 hours, whereupon gaseous ethane evolves and the reaction product formed is investigated by NMR spectroscopy. The $^1$H-NMR spectrum in CD$_2$Cl$_2$ shows that the Si—H moieties have completely reacted.

$^{29}$Si-NMR (CD$_2$Cl$_2$): δ (ppm)=−68 to −65 ppm (O-$\underline{\text{Si}}$Me (OSiMe$_3$)—O), −23 to −19 (O—$\underline{\text{Si}}$Me$_2$—O), 7-8 (O—$\underline{\text{Si}}$Me$_3$)ppm.

Example 4

102.4 mg (0.98 mmol) of methoxytrimethylsilane and 159.1 mg (1.17 mmol) of dimethylphenylsilane are mixed under an inert gas atmosphere at 20 to 25° C. and a solution of 0.196 mg (0.223 μmol) of $(\pi\text{-Me}_5C_5)Si^+B(C_6F_5)_4^-$ in 35 mg of dideuterodichloromethane is added. The mixture is heated at 80° C. for 2 hours, whereupon 1,1-dimethyl-1-phenyl-3,3,3-trimethyldisiloxane is formed with elimination of gaseous methane. The product is investigated by gas chromatography and NMR spectroscopy. $^1$H-NMR (CD$_2$Cl$_2$): δ=0.30 (s, SiMe$_3$), 0.52 (s, SiMe$_2$), 7.46-7.57 (m, 3 aromatic H), 7.69-7.79 (m, 2 aromatic H).

Example 5

101.9 mg (0.862 mmol) of ethoxytrimethylsilane and 150.8 mg (1.02 mmol) of 1,1,3,3,3-pentamethyldisiloxane are mixed under an inert gas atmosphere at 20 to 25° C., to which are added with shaking a solution of 0.80 mg (0.95 μmol) of $(\pi\text{-Me}_5C_5)Si^+B(C_6F_5)_4^-$ in 10 mg of dideuterodichloromethane. The mixture is heated at 80° C. for 2 hours, whereupon 1,1,1,3,3,5,5,5-octamethyltrisiloxane is formed with elimination of gaseous ethane. The $^1$H-NMR investigation shows that both the Si—H signal and the signals of the ethoxy group have disappeared.

Example 6

To 130 mg (1.46 mmol) of dimethylethoxysilane under an inert gas atmosphere at 20 to 25° C. is added with shaking a solution of 0.12 mg (0.18 µmol) of (π-Me$_5$C$_5$) Si$^+$HB (C$_6$F$_5$)$_3^-$ in 10 mg of dideuterodichloromethane. The mixture is heated at 80° C. for 2 hours, whereupon a polydimethylsiloxane is formed with elimination of gaseous ethane. The $^1$H-NMR investigation shows that both the Si—H signal and the signals of the ethoxy group have largely disappeared (residual fractions <2%).

Example 7

203.2 mg (0.746 mmol) of diethoxydiphenylsilane and 139.9 mg (1.48 mmol) of dimethylchlorosilane are mixed under an inert gas atmosphere and a solution of 0.32 mg (0.47 µmol) of (π-Me$_5$C$_5$)Si$^+$HB(C$_6$F$_5$)$_3^-$ in 23 mg of dideuterodichloromethane is added while shaking. The mixture is heated at 60° C. for 2 hours, whereupon 1,5-dichloro-1,1,5,5-tetramethyl-3,3-diphenyltrisiloxane is formed with elimination of gaseous ethane. $^1$H-NMR investigation also shows that both the Si—H signal and the signals of the ethoxy group have disappeared. Product analysis: $^1$H-NMR (CD$_2$Cl$_2$): δ=0.55 (s, 2 ClSiMe$_2$), 7.37-7.54 (m, 2×3 aromatic H), 7.66-7.75 (m, 2×2 aromatic H). Mass spectrum: m/e=400/402 (M$^+$–H).

Example 8: Preparation of Cp*Si$^+$BH(C$_6$F$_5$)$_3$—

All operating steps are carried out under Ar. 100 mg (0.335 mmol) of decamethylsilicocene and 172 mg (0.335 mmol) of tris(pentafluorophenyl)borane are each dissolved in 0.5 ml of CD$_2$Cl$_2$ and the two solutions are combined. Heptane is added whereupon a colorless crystalline precipitate of the compound (Me$_5$C$_5$)Si$^+$BH(C$_6$F$_5$)$_3^-$ is formed. The suspension is concentrated a little under reduced pressure to remove CD$_2$Cl$_2$ and 1 ml of heptane is again added. The solution is removed using a syringe and the crystalline residue is washed twice with 1 ml of heptane each time. The crystalline product is dried under high vacuum at 20° C. and 155 mg (64%) of the pure product (Me$_5$C$_5$)Si$^+$BH(C$_6$F$_5$)$_3^-$ is obtained.

The invention claimed is:
1. A method for preparing siloxanes, by condensation of an Si—H function with an Si-alkoxy function comprising:
Reacting:
a compound A with a compound B, or
a compound A with a compound C, or
a compound B with a compound C, or
a compound C without compounds A and B
in the presence of a compound D at at least 40° C.,
wherein
compound A is a silane or a siloxane having at least one silicon-bonded hydrogen atom,
compound B is a silane or a siloxane having at least one silicon-bonded alkoxy moiety,
compound C is a silane or a siloxane having at least one silicon-bonded hydrogen atom and at least one silicon-bonded alkoxy moiety, and
compound D is a cationic Si(II) compound of formula V

$$([Si(II)Cp]^+)_a X^{a-}, \quad (V)$$

in which
Cp is a π-bonded cyclopentadienyl radical of formula VI,

(VI)

R$^y$ are monovalent radicals or polyvalent radicals which are optionally bonded to one another to form one or more fused rings and
X$^{a-}$ signifies an a valent anion which does not react with the cationic silicon(II) center under the reaction conditions, or
the compound D is selected from the cationic Si(II) compounds:

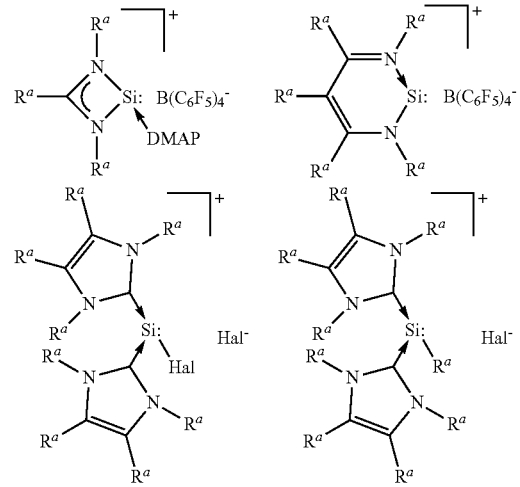

wherein the radicals R$^a$ are each independently hydrocarbon radicals and Hal signifies halogen, and with the proviso that compound B contains no vinyl group.
2. A mixture M, comprising:
(a) a compound A and a compound B, or
a compound A and a compound C, or
a compound B and compound C,
and (b) a compound D,
wherein
compound A is a silane or a siloxane having at least one silicon-bonded hydrogen atom,
compound B is a silane or a siloxane having at least one silicon-bonded alkoxy moiety,
compound C is a silane or a siloxane having at least one silicon-bonded hydrogen atom and at least one silicon-bonded alkoxy moiety, and
compound D is a cationic Si(II) compound of formula V $$([Si(II)Cp]^+)_a X^{a-}, \quad (V)$$

with the proviso that compound B has no vinyl group.
3. The method of claim 1, wherein the compound A has the formula I $$R^1 R^2 R^3 Si—H \quad (I)$$

wherein the radicals $R^1$, $R^2$ and $R^3$ each independently are hydrogen, halogen, silyloxy radicals or hydrocarbon radicals, wherein individual carbon atoms in each case are optionally replaced by oxygen atoms, halogen, sulfur or phosphorus atoms.

4. The mixture M of claim 2, wherein the compound A has the formula I

$$R^1R^2R^3Si\text{—}H \quad (I)$$

wherein the radicals $R^1$, $R^2$ and $R^3$ each independently are hydrogen, halogen, silyloxy radicals or hydrocarbon radicals, wherein individual carbon atoms in each case are optionally replaced by oxygen atoms, halogen, sulfur or phosphorus atoms.

5. The method of claim 1, wherein compound B has the formula III

$$R^4R^5R^6Si\text{—}O\text{—}CH_2\text{—}R^7 \quad (III)$$

wherein the radicals $R^4$, $R^5$ and $R^6$ each independently are hydrogen, halogen, silyloxy radicals or hydrocarbon radical, wherein individual carbon atoms in each case are optionally replaced by oxygen atoms, halogen, sulfur or phosphorus atoms and $R^7$ is hydrogen or a hydrocarbon radical, in which individual non-adjacent carbon atoms are optionally replaced by oxygen atoms, silicon, halogen, sulfur or phosphorus atoms.

6. The mixture M of claim 2, wherein compound B has the formula III

$$R^4R^5R^6Si\text{—}O\text{—}CH_2\text{—}R^7 \quad (III)$$

wherein the radicals $R^4$, $R^5$ and $R^6$ each independently are hydrogen, halogen, silyloxy radicals or hydrocarbon radical, wherein individual carbon atoms in each case are optionally replaced by oxygen atoms, halogen, sulfur or phosphorus atoms and $R^7$ is hydrogen or a hydrocarbon radical, in which individual non-adjacent carbon atoms are optionally replaced by oxygen atoms, silicon, halogen, sulfur or phosphorus atoms.

7. The method of claim 1, wherein compound C has the formula IV

$$R^8R^9R^{10}Si\text{—}O\text{—}CH_2\text{—}R^{11} \quad (IV)$$

wherein the radicals $R^8$, $R^9$ and $R^{10}$ each independently are hydrogen, halogen, silyloxy radicals, or hydrocarbon radicals, wherein individual carbon atoms in each case are optionally replaced by oxygen atoms, halogen, sulfur or phosphorus atoms, and $R^{11}$ are hydrogen or a hydrocarbon radical, in which individual non-adjacent carbon atoms are optionally replaced by oxygen atoms, silicon, halogen, sulfur or phosphorus atoms, wherein at least one of the radicals $R^8$, $R^9$ and $R^{10}$ is hydrogen or at least one of the radicals $R^8$, $R^9$ and $R^{10}$ is a silyloxy radical which has a hydrogen atom bonded directly to silicon.

8. The mixture M of claim 1, wherein compound C has the formula IV

$$R^8R^9R^{10}Si\text{—}O\text{—}CH_2\text{—}R^{11} \quad (IV)$$

wherein the radicals $R^8$, $R^9$ and $R^{10}$ each independently are hydrogen, halogen, silyloxy radicals, or hydrocarbon radicals, wherein individual carbon atoms in each case are optionally replaced by oxygen atoms, halogen, sulfur or phosphorus atoms, and $R^{11}$ are hydrogen or a hydrocarbon radical, in which individual non-adjacent carbon atoms are optionally replaced by oxygen atoms, silicon, halogen, sulfur or phosphorus atoms, wherein at least one of the radicals $R^8$, $R^9$ and $R^{10}$ is hydrogen or at least one of the radicals $R^8$, $R^9$ and $R^{10}$ is a silyloxy radical which has a hydrogen atom bonded directly to silicon.

9. The method of claim 3, wherein the silyloxy radical has the formula II

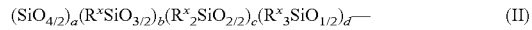

$$(SiO_{4/2})_a(R^xSiO_{3/2})_b(R^x{}_2SiO_{2/2})_c(R^x{}_3SiO_{1/2})_d\text{—} \quad (II)$$

in which $R^x$ are each independently hydrogen, halogen, unbranched, branched, linear, acyclic or cyclic, saturated or mono- or polyunsaturated C1-C20 hydrocarbon radicals or unbranched, branched, linear or cyclic, saturated or mono- or polyunsaturated C1-C20 hydrocarbon radicals, wherein individual carbon atoms are optionally replaced by oxygen, halogen or sulfur and a, b, c and d are each independently integral values from 0 to 100 000, wherein the sum total of a, b, c and d together has at least the value 1.

10. The mixture M of claim 8, wherein the silyloxy radical has the formula II

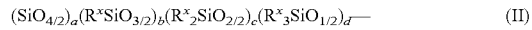

$$(SiO_{4/2})_a(R^xSiO_{3/2})_b(R^x{}_2SiO_{2/2})_c(R^x{}_3SiO_{1/2})_d\text{—} \quad (II)$$

in which $R^x$ are each independently hydrogen, halogen, unbranched, branched, linear, acyclic or cyclic, saturated or mono- or polyunsaturated C1-C20 hydrocarbon radicals or unbranched, branched, linear or cyclic, saturated or mono- or polyunsaturated C1-C20 hydrocarbon radicals, wherein individual carbon atoms are optionally replaced by oxygen, halogen or sulfur and a, b, c and d are each independently integral values from 0 to 100 000, wherein the sum total of a, b, c and d together has at least the value 1.

11. The method of claim 9, wherein the sum total of a+b+c+d is from 4 to 20,000.

12. The mixture M of claim 10, wherein the sum total of a+b+c+d is from 4 to 20,000.

13. The method of claim 1, wherein the radicals $R^y$ are each independently hydrogen or C1-C20 hydrocarbon radicals.

14. The mixture M of claim 2, wherein the radicals $R^y$ are each independently hydrogen or C1-C20 hydrocarbon radicals.

15. The method of claim 1, wherein $X^-$ is selected from the group consisting of $BF_4^-$, $ClO_4^-$, $AlZ_4^-$, $MF_6^-$ where Z=halogen and M=P, As or Sb, aryl borate anion wherein the aryl radical is phenyl or fluorinated phenyl or phenyl substituted by perfluoroalkyl radicals, monovalent polyhedral anions, alkoxy metallation and aryloxy metallation, tetrachlorometallates $[MCl_4]^-$ where M=Al, Ga, tetrafluoroborates $[BF_4]^-$, hexafluorometallates $[MF_6]^-$ where M=As, Sb, Ir, Pt, perfluoroantimonates $[Sb_2F_{11}]^-$, $[Sb_3F_{16}]^-$ and $[Sb_4F_{21}]^-$, triflate (=trifluoromethanesulfonate) $[OSO_2CF_3]^-$, tetrakis(trifluoromethyl)borate $[B(CF_3)_4]^-$, tris(pentafluorophenyl)hydridometallates $[MH(C_6F_5)_3]^-$ where M=B, Al, Ga, tetrakis(pentafluorophenyl)metallates $[M(C_6F_5)_4]^-$ where M=B, Al, Ga, tetrakis(pentachlorophenyl)borate $[B(C_6Cl_5)_4]^-$, tetrakis [(2,4,6-trifluoromethyl (phenyl)]borate $\{B\ [C_6H_2(CF_3)_3]\}^-$, [bis[tris(pentafluorophenyl)] hydroxide $\{HO\ [B(C_6F_5)_3]_2\}^-$, closo-carborates $[CHB_{11}H_5Cl_6]^-$, $[CHB_{11}H_5Br_6]^-$, $[CHB_{11}(CH_3)_5Br_6]^-$, $[CHB_{11}F_{11}]^-$, $[C(Et)B_{11}F_{11}]^-$, $[CB_{11}(CF_3)_{12}]^-$ and $B_{12}Cl_{11}N$ (CH$_3$)$_3$]$^-$, tetra(perfluoroalkoxy)aluminates [Al(OR$^{PF}$)$_4$]$^-$, tris(perfluoroalkoxy)fluoroaluminates [FAl(OR$^{PF}$)$_3$]$^-$hexakis(oxypentafluorotellurium)—antimonate [Sb(OTeF$_5$)$_6$]$^-$, and mixtures thereof.

16. The mixture M of claim 2, wherein X$^-$ is selected from the group consisting of BF$_4^-$, ClO$_4^-$, AlZ$_4^-$, MF$_6^-$ where Z=halogen and M=P, As or Sb, aryl borate anion wherein the aryl radical is phenyl or fluorinated phenyl or phenyl substituted by perfluoroalkyl radicals, monovalent polyhedral anions, alkoxy metallation and aryloxy metallation, tetrachlorometallates [MCl$_4$]$^-$ where M=Al, Ga, tetrafluoroborates [BF$_4$]$^-$, hexafluorometallates [MF$_6$]$^-$ where M=As, Sb, Ir, Pt, perfluoroantimonates [Sb$_2$F$_{11}$]$^-$, [Sb$_3$F$_{16}$]$^-$ and [Sb$_4$F$_{21}$]$^-$, triflate (=trifluoromethanesulfonate) [OSO$_2$CF$_3$]$^-$, tetrakis(trifluoromethyl)borate [B(CF$_3$)$_4$]$^-$, tris(pentafluorophenyl)hydridometallates [MH(C$_6$F$_5$)$_3$]$^-$ where M=B, Al, Ga, tetrakis(pentafluorophenyl)metallates [M(C$_6$F$_5$)$_4$]$^-$ where M=B, Al, Ga, tetrakis(pentachlorophenyl)borate [B(C$_6$Cl$_5$)$_4$]$^-$, tetrakis [(2,4,6-trifluoromethyl(phenyl)]borate {B [C$_6$H$_2$(CF$_3$)$_3$]}$^-$, [bis[tris(pentafluorophenyl)] hydroxide {HO [B(C$_6$F$_5$)$_3$]$_2$}$^-$, closo-carborates [CHB$_{11}$H$_5$Cl$_6$]$^-$, [CHB$_{11}$H$_5$Br$_6$]$^-$, [CHB$_{11}$(CH$_3$)$_5$Br$_6$]$^-$, [CHB$_{11}$F$_{11}$]$^-$, [C(Et)B$_{11}$F$_{11}$]$^-$, [CB$_{11}$(CF$_3$)$_{12}$]$^-$ and B$_{12}$Cl$_{11}$N(CH$_3$)$_3$]$^-$, tetra(perfluoroalkoxy)aluminates [Al(OR$^{PF}$)$_4$]$^-$, tris(perfluoroalkoxy)fluoroaluminates [FAl(OR$^{PF}$)$_3$]$^-$hexakis(oxypentafluorotellurium)-antimonate [Sb(OTeF$_5$)$_6$]$^-$, and mixtures thereof.

17. The method of claim 1, wherein additives E which are not reactive with components A, B, C and D, and which are selected from processing aids, fillers, adhesion promoters, stabilizers, pigments, plasticizers, organic polymers, heat stabilizers, inhibitors, biologically active ingredients and polyorganosiloxanes, are present.

18. The mixture M of claim 2, wherein additives E which are not reactive with components A, B, C and D, and which are selected from processing aids, fillers, adhesion promoters, stabilizers, pigments, plasticizers, organic polymers, heat stabilizers, inhibitors, biologically active ingredients and polyorganosiloxanes, are present.

\* \* \* \* \*